United States Patent
Wrench

[15] 3,688,685
[45] Sept. 5, 1972

[54] ELECTRIC BROILER FOR SIMULTANEOUSLY BROILING A PLURALITY OF LARGE VIANDS

[72] Inventor: R. F. Wrench, Rte. 1, Godwin, N.C. 28344

[22] Filed: March 12, 1971

[21] Appl. No.: 123,656

[52] U.S. Cl. ....................99/427, 99/446, 99/448, 219/395, 219/405, 219/411, 219/412, 219/521, 219/524
[51] Int. Cl. ............................................A47j 27/12
[58] Field of Search......219/395, 405, 411, 412, 523, 219/524, 525, 521; 99/390, 426–427, 446, 448; 220/19

[56] References Cited

UNITED STATES PATENTS

| | | | |
|---|---|---|---|
| 3,154,004 | 10/1964 | Huck | 99/390 |
| 2,705,913 | 4/1955 | Bloom | 99/427 |
| 3,108,173 | 10/1963 | Barrett et al. | 219/411 X |
| 3,236,998 | 2/1966 | Wertheimer et al. | 219/524 |
| 3,338,156 | 8/1967 | Angelos | 99/427 |
| 3,368,063 | 2/1968 | Kuhn | 219/411 |

*Primary Examiner*—Volodymyr Y. Mayewsky
*Attorney*—Shoemaker & Mattare

[57] ABSTRACT

A broiler for simultaneously broiling a plurality of viands, comprising an upper, lid portion and a bottom portion movably jointed together so that the lid portion can be selectively positioned over and removed from the bottom, means carried by the bottom portion for supporting said viands thereon, and heating element means carried by the lid portion and extending above and below the viands supported by the bottom portion for cooking the viands, said heating elements being so arranged and so spaced with respect to the viands being cooked and the support thereof that drippings from the viands as they are cooked do not fall on the heating elements, thus eliminating the necessity of providing shield means on the heating elements.

25 Claims, 7 Drawing Figures

INVENTOR
R. F. WRENCH

BY Shoemaker and Mattare
ATTORNEYS

INVENTOR
R. F. WRENCH

BY *Shoemaker and Mattare*

ATTORNEYS

PATENTED SEP 5 1972 3,688,685

INVENTOR
R. F. WRENCH

BY *Shoemaker and Mattare*
ATTORNEYS

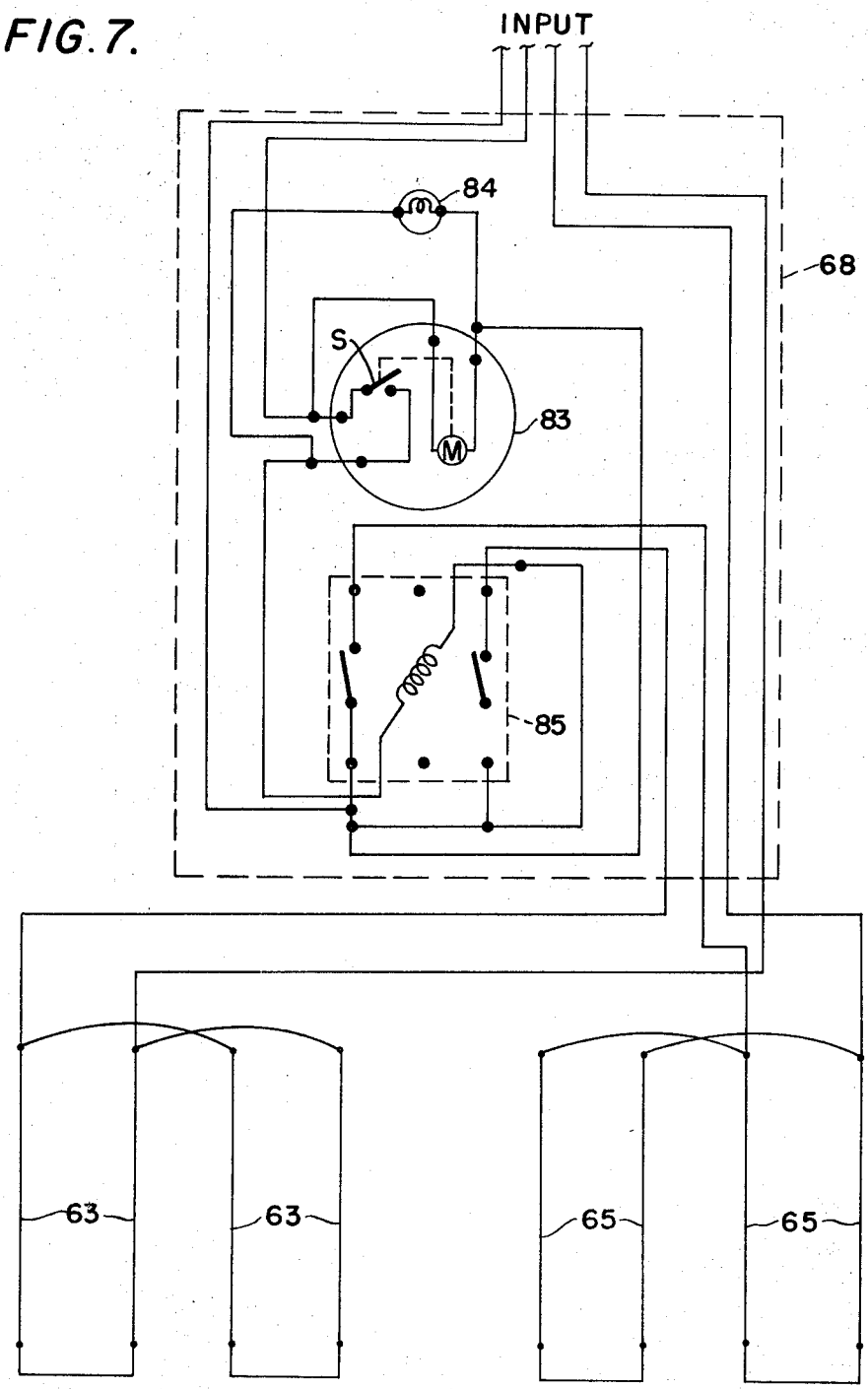

3,688,685

ELECTRIC BROILER FOR SIMULTANEOUSLY BROILING A PLURALITY OF LARGE VIANDS

BACKGROUND OF THE INVENTION

This invention relates to a means for simultaneously broiling a plurality of large viands, such as meat products or fowl or the like.

More particularly, this invention relates to a broiler for broiling meat products such as hams and shoulders and the like in commercial establishments.

Such broilers generally must be capable of broiling several hundred pounds of meat at a time and thus these devices are quite large. It is important that the temperature be maintained relatively constant and uniform throughout the broiler so that the meat will be properly broiled. Due to the large size of the broilers, it is difficult to maintain a substantially constant and evenly distributed temperature inside the broiler and at the same time provide a device which is easily serviceable and durable in operation.

Some prior art devices utilize a plurality of heating elements inside the broiler adapted to be disposed above and below the meat, respectively, with the heating elements evenly spaced throughout the broiler for maintaining a substantially constant and uniform temperature in the broiler. These devices are cumbersome and difficult to service because of the arrangement of heating elements in the broiler and the use of shield means for preventing grease from the meat from dropping on the heating elements while the meat is cooking. It is particularly difficult to clean such devices, which must be done periodically, and frequent maintenance must be performed on the broiler structure and heating elements, which deteriorate rapidly due to contact with the grease and with cleaning solutions such as water and the like used to periodically clean the broiler.

The frequent maintenance and cleaning required of such prior art broilers is both time consuming and expensive, and it is difficult to maintain such broilers in a condition whereby the broiler will pass Federally required and conducted inspections. Moreover, such prior art broilers require up to 8 hours to properly broil 300 or 400 pounds of meat.

The broiler provided by the present invention solves the above problems in a simple and efficient manner. In the present invention, support means are provided on a bottom portion of the broiler for supporting meat to be broiled and the heating elements for broiling the meats are supported on a lid or top portion of the broiler, said heating elements adapted to be disposed above and below the meat, respectively, when the lid is operatively positioned on the bottom portion. The heating elements are spaced relative to the meat and meat supporting means such that grease exuded by the meat as it is being broiled does not fall on the heating elements, and because the heating elements are supported by the top portion of the broiler, they are not exposed to cleaning solutions such as water and the like when the broiler is periodically cleaned. The broiler according to the present invention is, therefore, easily cleaned and serviced and is exceptionally durable, and one person is able to readily load and unload baskets of meat in the broiler.

The spaced relationship of the heating elements relative to the meat as it is being broiled eliminates the necessity of providing shield means for the heating elements and both the cost and difficulty of servicing the broiler are therefore substantially reduced.

OBJECTS OF THE INVENTION

It is an object of this invention to provide a broiler for simultaneously broiling a plurality of viands therein and which is exceptionally simple and economical in construction.

Another object of this invention is to provide a broiler wherein meat supporting means are carried by a bottom portion of the broiler and heating elements for broiling the meat are supported by a top portion of the broiler.

An even further object of the invention is to provide a broiler wherein the heating elements are disposed above and below meat products supported in said broiler with the heating elements being spaced laterally from the meat so that grease and the like exuded from the meat so it is being broiled does not fall onto the heating elements.

Yet another object of this invention is to provide a broiler which has a plurality of independent controls for controlling a plurality of independent heating circuits in the broiler whereby meat may be broiled at different rates in different portions of the broiler.

Yet another object of this invention is to provide a broiler wherein the heating elements and control means therefor are removed from the corrosive environment of a cleaning fluid such as water or the like used to periodically clean the broiler when the broiler is cleaned.

BRIEF DESCRIPTION OF THE DRAWINGS

FIG. 7 is a wiring diagram of a control means and the heating elements for one side of the broiler shown in FIG. 1.

DETAILED DESCRIPTION OF THE INVENTION

Figure 1:
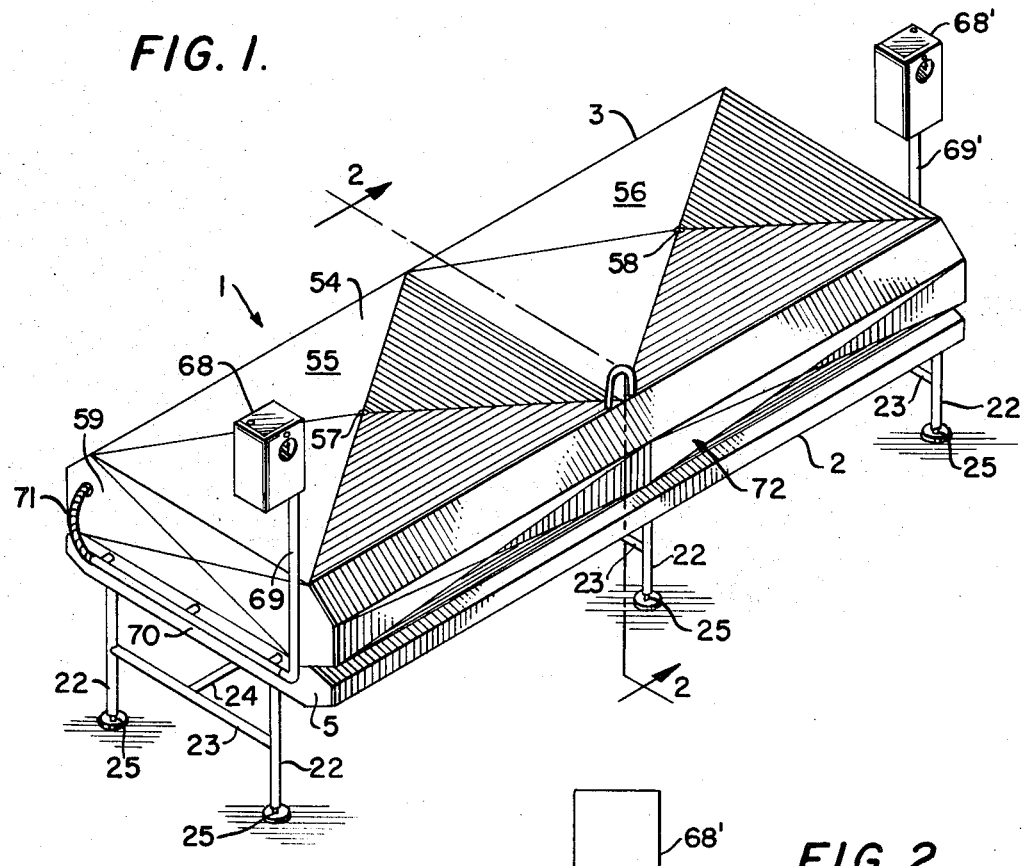
FIG. 1 is a top perspective view of a broiler according to the present invention.
Figure 2:
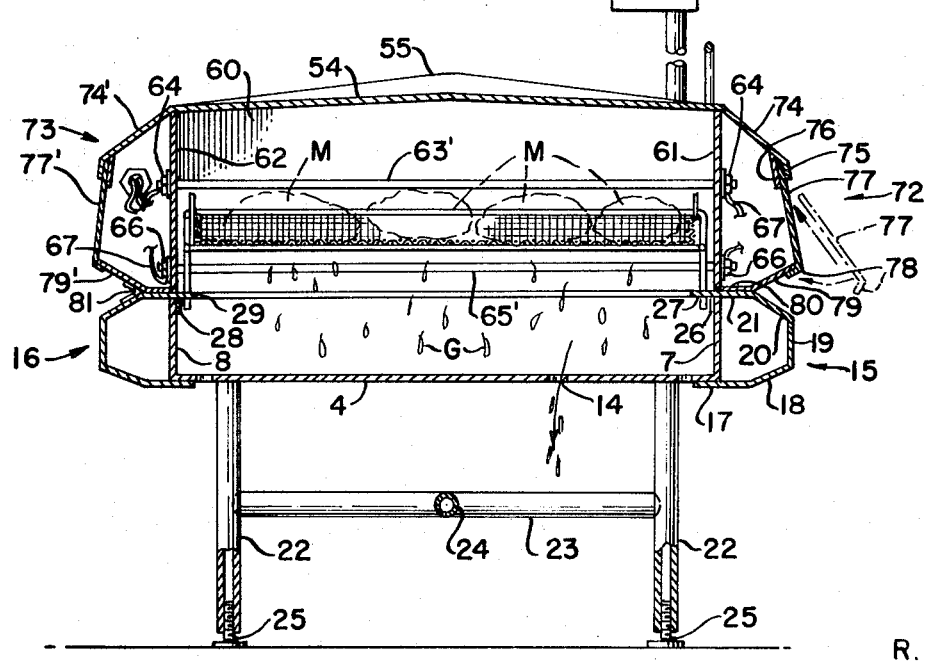
FIG. 2 is a sectional view taken along the line 2—2 in FIG. 1.
Figure 3:
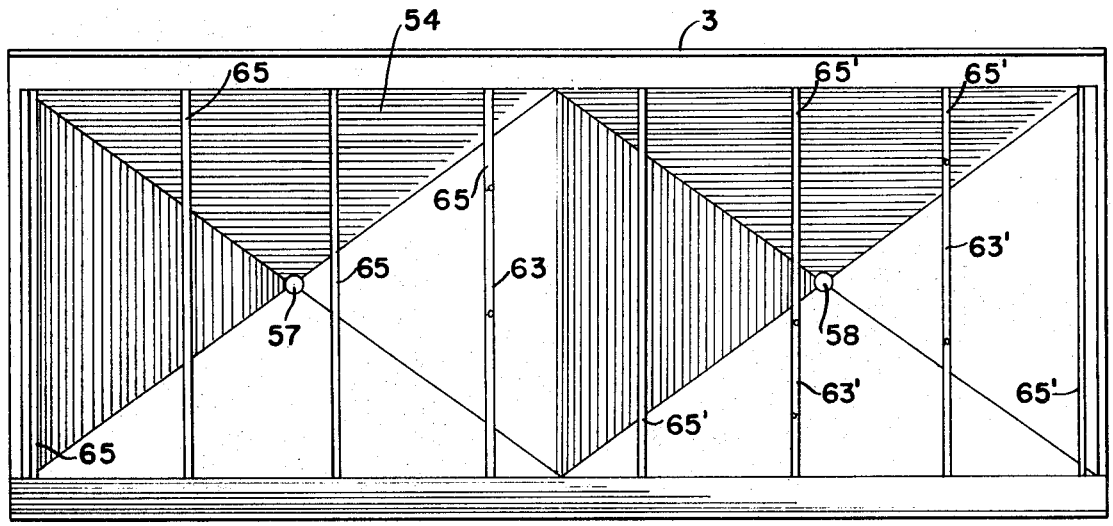
FIG. 3 is a plan view looking inside the top portion or lid of the broiler in FIG. 1.

Referring now to the drawings, wherein like reference numerals refer to like parts throughout the several views, a broiler in accordance with the present invention is indicated generally at 1 in FIG. 1 and comprises a bottom 2 and a lid 3 hingedly joined together. The broiler is comprised of a plurality of sheets or sections, preferably of 12 gauge stainless steel, welded together to form a rigid and substantially airtight structure from which little heat escapes when meat is being broiled therein. The stainless steel is polished to give a pleasing appearance and to provide a reflecting surface on the inside thereof for reflecting the heat radiated from heating elements in said broiler.

Figure 4:
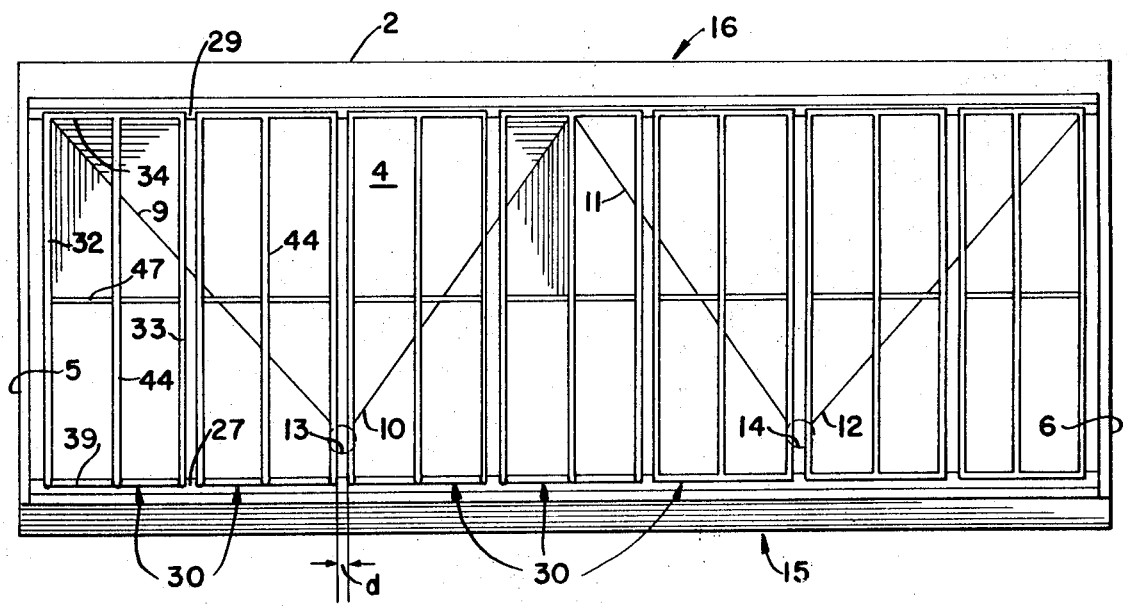
FIG. 4 is a plan view looking inside the bottom portion of the broiler in FIG. 1.

The bottom 2 has a bottom wall 4, opposite end walls 5 and 6, and upstanding, parallel, longitudinally extending front and back walls 7 and 8, respectively, at opposite edges of the bottom wall 4. As best seen in FIG. 4, the bottom wall 4 has an irregular shape formed by bending or deforming the wall downwardly along the lines 9, 10, 11 and 12, to form drain channels or creases for conveying grease and the like to a pair of drain openings 13 and 14 adjacent the front edge of the bottom wall 4.

Grease drippings and the like from meat being broiled are thus conveyed from the interior of the broiler to a suitable container means (not shown) placed under the broiler exteriorly thereof.

The bottom wall 4 and front and back walls 7 and 8 may be formed integrally from a single sheet of stainless steel, or the bottom wall 4 and front and back walls 7 and 8 may be comprises of a plurality of separate sheets or sections of stainless steel welded or otherwise suitably secured together.

A cover means 15 is provided in shielding or covering relationship to front wall 7 and an identically constructed cover means 16 is provided in shielding or covering relationship to back wall 8. Since cover means 15 is identical to cover means 16, only cover means 15 will be described in detail, the same reference numerals primed applied to cover means 16. The cover means 15 has a bottom wall with a first, substantially horizontally extending portion 17 extended beneath and in abutting contact with the bottom surface of bottom wall 4 and suitably secured thereto as by welding or the like, and a second portion 18 bent or deflected slightly upwardly. A front wall 19 extends generally vertically from the upper marginal edge of inclined wall 18 and a reversely inclined wall 20 extends rearwardly and upwardly from the upper marginal edge of front wall 19. A substantially horizontal top wall 21 extends rearwardly from the upper marginal edge of inclined wall 20 in generally parallel relationship to bottom wall 17 and is welded or otherwise suitably secured to the top marginal edge of front wall 7.

A plurality of vertically extending, elongate support legs 22 are suitably secured at their upper ends to the bottom wall 4 as by welding or the like. The legs 22 are braced by means of a plurality of transversely extending brace members 23 welded or otherwise suitably secured at their opposite ends to a pair of front and back legs, respectively, and a longitudinally extending brace member 24 welded or otherwise suitably secured at approximately the mid portion of each of the transversely extending brace members 23. The support means is vertically adjustable by means of an adjustment bolt 25 or the like threadably engaged in the end of each of the vertically extending support legs 22 whereby the broiler may be made level or its height adjusted to suit the conditions under which the broiler is used.

An angle iron 26 is welded or otherwise suitably secured along the inside upper marginal edge of front wall 7 and defines a horizontally extending inwardly directed flange 27.

A second angle iron 28 is similarly welded along the inside upper marginal edge of back wall 8 and defines a horizontally extending inwardly directed flange 29.

Figure 5:
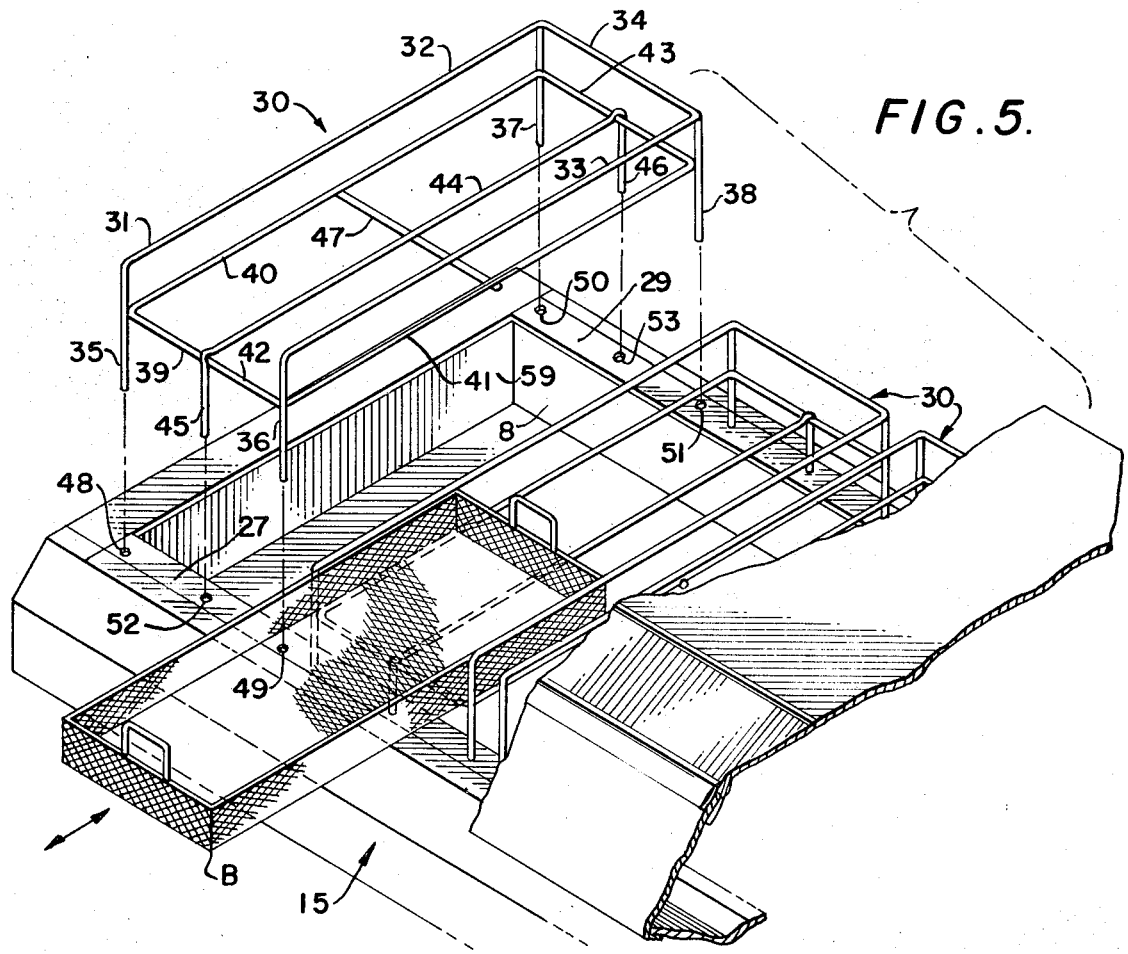
FIG. 5 is a perspective view of a portion of the broiler in FIG. 1, showing the manner in which the meat baskets are slid into and out of position on the support means removably carried by the bottom portion of the broiler.

As best seen in FIGS. 4 and 5, a plurality of aligned, adjacent, spaced apart meat supporting means 30 are supported on the bottom 2 of the broiler. Each of the support means 30 comprises a first elongate rod element 31 bent or deformed generally in the shape of a U with a pair of opposite, parallelly extending side rails 32 and 33 and a laterally extending back rail 34.

The front or free ends of side rails 32 and 33 are bent or deformed vertically downwardly at 35 and 36 to define a pair of front support legs for the support means 30.

A similar pair of vertically extending, rear support legs 37 and 39 are welded or otherwise suitably secured at their upper ends to the juncture of side rails 32 and 33 with back rail 34.

A second elongate rod element 39, bent in the shape of a rectangle, comprises a frame or brace for the support means 30 and is welded at its opposite corners to the vertically extending support legs 35, 36, 37 and 38 intermediate the ends thereof. The rectangularly shaped frame or brace 39 includes opposite, parallelly extending side rods 40 and 41 and opposite, parallelly extending end rods 42 and 43.

A third elongate, generally U-shaped longitudinally extending basket support rod 44, having the opposite ends thereof turned downwardly to define support legs 45 and 46 is welded or otherwise suitably fixed to the end rods 42 and 43 intermediate the ends thereof and in overlying relationship thereto.

An elongate, transversely extending bracing rod 47 is welded to the underside of side rods 40 and 41 and basket support rod 44 intermediate the ends thereof for bracing and rigidifying the support means 30.

The support legs 35, 36, 37, 38, 45 and 46 are adapted to be slidably received in aligned openings 48, 49, 50, 51, 52 and 53, respectively, in the flanges 27 and 29 of angle irons 26 and 28 for supporting the support means 30 on the bottom 2 of the broiler. The support legs may be supported in the openings in any suitable conventional manner. For example, the legs can extend downwardly into engage-ment with the bottom 4, as shown in U.S. Pat. No. 2,949,207. Alternatively, the legs can be formed to define a shoulder which engages the edge of an associated hole to support the legs as shown in U.S. Pat. No. 2,850,199. Further, suitable means such as an elongate, horizontal bar can be welded or otherwise secured to the legs to engage the edges of the hole to support the viand supports 30 in a predetermined elevated position as shown in U.S. Pat. No. 3,622,031. Even further, the viand supports 30 could be supported on the flanges 27 and 29 in a manner similar to that shown in U.S. Pat. No. 3,154,004, of record, if desired, wherein the lower ends of the legs would be bent at an angle to rest on top of the flange.

Figure 6:
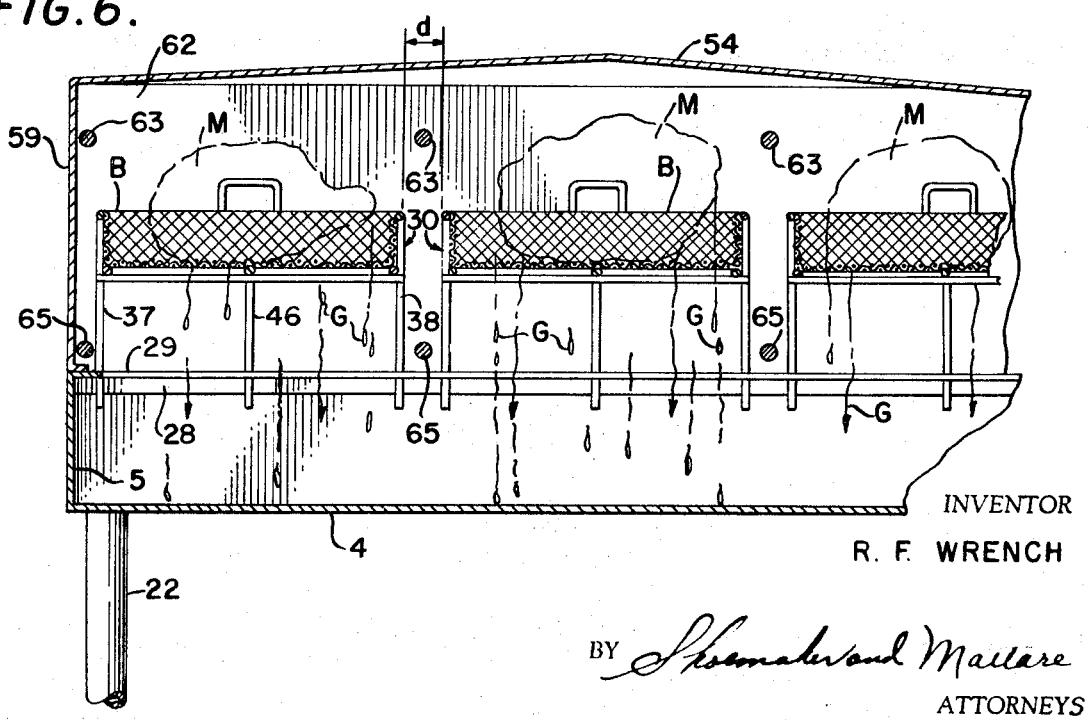
FIG. 6 is a front sectional view, partly broken away, of a portion of the broiler shown in FIG. 1, showing the spacing of the heating elements relative to the meat supports and meat supported thereby and showing how the heating elements are disposed out of the path of grease dripping from the meat as it is being broiled.

As seen in FIGS. 4, 5 and 6, the openings 48, 49, 50, 51, 52 and 53 are spaced along the flanges 27 and 29 such that adjacent support means 30 are spaced apart a predetermined distance $d$. Each of the support means 30 extends above the plane of the bottom 2 and a plurality of meat baskets B, formed of a wire mesh or the like, are slidably supported on the support means 30 in an elevation above the plane of the top of the bottom 2.

Each of the support means 30 is removable from the bottom 2 for cleaning or repair or the like simply by lifting up on the supports and withdrawing the legs from the openings in the flanges 27 and 29, and because the supports for the meat baskets are disposed at an elevation higher than the top of the bottom portion, one person may readily slide baskets filled with meats into and out of the broiler.

The top portion or lid 3 of the broiler comprises a top wall or roof 54 having a pair of adjacent, pyramid-shaped portions 55 and 56, each defined by four flat surfaced, triangler shaped portions joined along adjacent edges and coming to a peak at the apexes of the triangler shaped portions. Vent holes 57 and 58 are formed in each of the pyramidal portions 55 and 56 at the apexes thereof for venting gases such as steam and the like from within the broiler when meat is being broiled therein.

The lid 3 also includes opposite end walls 59 and 60 and front and back walls 61 and 62, respectively, at the front and back edges, respectively, of the roof 54.

The longitudinally extending, vertically disposed front wall 61 is in substantial vertical alignment with the front wall 7 on the bottom 2 and is welded or otherwise suitably secured to the marginal edge of the roof 54. The longitudinally extending, substantially vertically disposed back wall 62 is similarly welded or otherwise secured at its upper marginal edge to the back edge of the roof 54 and is in substantial vertical alignment with the back wall 8 on the bottom 2.

A plurality of equally spaced, parallel, upper heating elements 63 and 63' extend at their opposite ends through the walls 61 and 62 and are suitably secured to the walls as by welding or bolts 66 or the like. A plurality of equally spaced, parallel, bottom heating elements 65 and 65' in substantial vertical alignment with the top heating elements 63 and 63', extend at their opposite ends through the walls 61 and 62 adjacent the bottom marginal edges thereof and are suitably secured to the walls as by welding or bolts 66 or the like. The heating elements 63 and 65 are connected together in a circuit at the left half of the broiler and the heating elements 63' and 65' are connected in a circuit at the right half of the broiler. The vertical spacing between the top heating elements 63, 63' and the bottom heating elements 65, 65' is such that they are disposed above and below, respectively, the meat supporting means 30 and the meat M supported thereby. Further, the lateral spacing between the heating elements is such that a pair of upper and lower heating elements 63 and 65, is positioned in the space $d$ between adjacent support means 30. Accordingly, when a basket B containing meat M thereon is placed on the support means 30, and the heating elements are actuated, grease drippings G and the like exuded from the meat as it is being broiled drop downwardly into the space under the support means 30 and do not fall onto the heating elements 65 and 65', which are spaced laterally from the support means 30. In this way, shield means for the heating elements are not required and more efficient heating is realized than if a shield means were required over the heating elements. Thus, more meat may be broiled in a given amount of time than with prior art devices; while at the same time, fewer heating elements are required.

Suitable wires or cables such as number 10 asbestos wire 67 connect the top and bottom heating elements 63, 65 and 63', 65' in a series parallel arrangement with the heating elements 63, 65 in the left hand portion of the broiler being connected in one circuit with a first electrical control 68 and the heating elements 63', 65' in the right hand portion of the broiler being connected in a circuit with a second electrical control 68'. Each of the controls 68 and 68' is supported in an elevated position relative to the broiler by means of suitable support means preferably comprising stainless steel tubing 69 and 69' extending vertically from the control to a horizontally disposed portion 70 supported on the end wall 5 of the bottom 2 of the broiler and through which a suitable cable such as a 1 inch Greenfield cable 71 extends from the controller to the various heating elements connected in the circuit therewith.

Since the control elements 68 and 68' are mounted in an elevated position relative to the broiler, they are not exposed to water or the like when the broiler is cleaned.

Indentically constructed covers 72 and 73 are provided over the front wall 61 and back wall 62, respectively, of the lid 3 and since they are identically constructed, only the front cover 72 will be described in detail, the same reference numerals primed being applied to the cover 73 over the back wall 62.

The cover 72 comprises a downwardly sloping top section or wall 74 welded or otherwise suitably secured at its top edge to the front marginal edge of the roof or cover 54 of the lid and having a pair of spaced, parallel, downwardly turned flanges 75 and 76 along the lower marginal edge thereof defining a longitudinally extending channel or recess in which is removably positioned the upper marginal edge of a removable panel 77 comprising an elongate, generally rectangularly shaped section having its bottom marginal edge 78 turned rearwardly and received under the upper marginal edge of an upturned bottom section 79, which includes a horizontally extending portion 80 welded or otherwise suitably secured to the bottom marginal edge of front wall 61. The rearwardly turned flange or lip 78 on the removable panel 77 is fixed to the upturned edge of bottom section 79 by means of a plurality of screws or the like (not shown). By removing the panel 77, access may be had to the ends of the heating elements for servicing and maintenance thereon.

A plurality of suitable hinges 81, welded or otherwise suitably secured to the back edges of the lid 3 and bottom 2, pivotally connect the lid and bottom of the broiler so that the lid may be pivoted up away from the bottom to permit access to the meat baskets B for removing meat from the broiler and placing meat therein, and for cleaning and servicing the broiler.

Each of the cover means 72 and 73 is substantially water tight due to the welded connection of walls 74 and 80 with the roof 54 and wall 61, respectively, and the positioning of the upper edge of removable panel 77 between the downwardly turned flanges 75 and 76 on the upper section or wall 74, and accordingly, there is little likelihood of water reaching the ends of the heating elements and thus damaging them when the broiler is cleaned.

Referring particularly to FIG. 6, the manner in which grease drippings G from the meat M fall downwardly into the bottom 2 in spaced relation to the heating element 65 can readily be seen. This spaced relationship of the heating elements, meat supports, and meat supported thereon enables the heating elements to be used without any shield means whatsoever and results in a more economical, easier to maintain, and more durable and efficient broiler than prior art devices.

A suitable eye or hook 82 or the like is welded or otherwise suitably secured to the mid-portion of the front marginal edge of lid 3 for raising and lowering the lid.

Referring now to FIG. 7, the wiring diagram for one of the controls 68 and associated heating elements 63 and 65 is shown. The control 68 is a commercially available unit manufactured by Automatic Timing and Control Corporation, and includes an input controller 83 having motor means m therein and switch means S for energizing the heating elements in the broiler in a predetermined sequence as determined by setting an indicator on the controller. A light 84 indicates when the circuit is energized and a magnetic contactor 85 includes switch means for energizing the heating elements 63 and 65.

By way of specific example, a broiler in accordance with the invention is approximately 10 feet long and 3 feet high, including the leg supports and the bottom and top portions of the broiler. The control elements 68 and 68' are spaced upwardly from the top of the broiler approximately 1 foot. The meat supports 30 are made up of ⅜ inch stainless steel rod and are spaced inwardly from the ends of the broiler approximately 3 inches. The meat supports themselves are approximately 1 foot 3 inches wide, and the spacing between adjacent meat supports 30 is approximately 1 ½ inches. The heating elements 63 and 65 are Calrod radiant heat elements and have a diameter of approximately three-eighths of an inch and are spaced apart approximately 1 foot, 4 ½ inches, with the heating elements adjacent the ends of the broiler spaced inwardly approximately 2 inches from the end thereof. The support legs 22 are approximately 1 ½ feet long and are made of stainless steel tubing having a diameter of approximately 1 inch.

A broiler in accordance with the present invention is capable of broiling approximately 750 pounds of meat in four hours with the controls 68 and 68' set at an optimum level. The controls may be regulated, however, for a low heat and the meat may be broiled over a longer period of time, such as over night. Further, inasmuch as the control elements 68 and 68' are individually and independently controllable, the heating elements 63 and 65 in one-half of the broiler may be operated at a different temperature than the heating elements 63' and 65' in the other half of the broiler, and either different meats may be cooked simultaneously in the broiler or meat may be cooked at different rates in different parts of the broiler.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A broiler for simultaneously broiling a plurality of large viands such as roasts of beef, hams, shoulders and the like which exude drippings during the broiling thereof, the broiler including a housing with a bottom portion for receiving drippings from broiling viands, a closure movably supported on the bottom and providing access to the interior of the housing for placing viands therein and removing same therefrom, viand support means in said housing for supporting a plurality of viands within the broiler, said support means having openings therethrough for said drippings, a plurality of spaced apart, elongate rod-like electric heating elements in the broiler and each extending substantially the width thereof, the heating elements fixed to and carried only by the closure, the spacing of the heating elements being such that some of the heating elements are above the viands and the remaining heating elements are below the viands, at least the heating elements below the viands being laterally spaced on opposite sides of the vainds beyond the path of drippings through said openings from said viands, and broiler support means engaging the underside of the housing to support the housing on a supporting surface.

2. A broiler as in claim 1, wherein said broiler is elongate, said closure and said bottom being of substantially the same size and movably joined together at one side along adjacent longitudinal edges thereof.

3. A broiler as in claim 2, wherein said closure and bottom are hingedly joined along said adjacent longitudinal edges.

4. A broiler as in claim 3, wherein said broiler support means comprises a plurality of elongate support legs connected to the bottom of said broiler for supporting said broiler in an elevated position.

5. A broiler as in claim 4, wherein the length of said legs is adjustable to vary the elevated position of said broiler or to enable said broiler to be leveled upon an uneven surface.

6. A broiler as in claim 3, wherein said bottom portion is generally rectangular in shape and includes a bottom wall, opposite end walls, and a front wall and back wall along opposite front and back edges thereof, respectively, said support means for supporting meat being carried by said bottom adjacent the top of said front and back walls.

7. A broiler as in claim 6, wherein a longitudinally extending angle iron is welded or otherwise suitably secured along the top marginal edge of each of the front and back walls with one flange of each angle iron extending substantially flush with the top marginal edge of said front and back walls and directed inwardly toward the opposite wall, said viand support means being supported on said flanges.

8. A broiler as in claim 7, wherein said viand support means comprises a plurality of rod-like elements joined together and having depending support legs at opposite ends thereof, said legs extending through aligned openings in said flanges.

9. A broiler as in claim 8, wherein said viand support means are removable from said bottom portion for cleaning and the like.

10. A broiler as in claim 9, wherein a plurality of viand support means are carried by said bottom portion, said plurality of viand support means being spaced apart to define spaces therebetween.

11. A broiler as in claim 10, wherein said heating element means comprises a plurality of vertically spaced, upper and lower rod-like electric heating elements, with pairs of upper and lower heating elements spaced laterally apart and disposed in parallel relationship, the lateral spacing of said heating elements being such that the heating elements are in registry or alignment with the spaces between adjacent viand support means.

12. A broiler as in claim 11, wherein said closure includes a roof, opposite end walls, and a front wall and back wall at opposite front and back edges of said roof, respectively, said end walls and said front and back walls on said closure being in substantial vertical alignment with the end walls and front and back walls on said bottom portion when said closure is positioned over said bottom portion.

13. A broiler as in claim 12, wherein said heating elements are supported at their opposite ends in the front and back walls, respectively, of said closure with the lower heating elements supported adjacent the lower marginal edges of said front and back walls and the upper heating elements supported in vertically spaced relationship above said lower heating elements, the spacing between said vertically spaced heating elements being such that the heating elements are disposed above and below meat to be broiled in said broiler when the lid is positioned in operative relationship over said bottom.

14. A broiler as in claim 13, wherein a basket means is removably supported on each of said support means, said meat being supported in said basket means.

15. A broiler as in claim 14, wherein said heating elements are Calrod heating elements.

16. A broiler as in claim 15, wherein at least some of said heating elements are independently controlled relative to at least some other of said heating elements whereby said some heating elements may be operated at different temperatures from said other heating elements.

17. A broiler as in claim 16, wherein said heating elements are evenly spaced throughout the length of said broiler and extend laterally thereof, the heating elements to the left of the longitudinal center of said broiler being connected in one circuit for control thereof, and the heating elements to the right of the longitudinal center of said broiler being connected in another circuit for control thereof.

18. A broiler as in claim 17, wherein an independent control means is provided connected in circuit with the heating elements disposed in the left portion of the boiler and a separate and independent electrical control is connected in circuit with the heating elements in the right half of the broiler for controlling the temperature of the heating elements in the left half of the broiler independently of the temperature of the heating elements in the right half of the broiler.

19. A broiler as in claim 18, wherein cover means is disposed exteriorly of said broiler over said front and back walls on said closure and on said bottom, said cover means on said closure portion including removable panel means permitting access to the ends of said heating elements which extend through said front and back walls, respectively.

20. A broiler as in claim 19, wherein said covers are water tight.

21. A broiler as in claim 20, wherein drain hole means are provided in the bottom wall of said bottom portion.

22. A broiler as in claim 20, wherein vent hole means are provided in the top wall of said closure.

23. A broiler as in claim 21, wherein said broiler is formed of stainless steel.

24. A broiler as in claim 23, wherein the broiler is approximately 10 feet long and 4½ feet wide.

25. A broiler as in claim 20, wherein said viand support means are spaced apart approximately 1½ inches.

* * * * *